(12) United States Patent
Martinelli et al.

(10) Patent No.: US 7,806,755 B1
(45) Date of Patent: Oct. 5, 2010

(54) FREE-STANDING COLLAPSIBLE GAME HOIST

(76) Inventors: David E. Martinelli, 1275 Valley Quail La., Auburn, CA (US) 95602; David D. Rogers, 20150 Bear Ridge Rd., Grass Valley, CA (US) 95949

( * ) Notice: Subject to any disclaimer, the term of this patent is extended or adjusted under 35 U.S.C. 154(b) by 0 days.

(21) Appl. No.: 11/981,284

(22) Filed: Oct. 30, 2007

Related U.S. Application Data

(60) Provisional application No. 60/855,039, filed on Oct. 30, 2006.

(51) Int. Cl.
*A22B 1/00* (2006.01)
*A22B 5/00* (2006.01)

(52) U.S. Cl. .................. 452/187; 452/185; 452/189

(58) Field of Classification Search .............. 452/185, 452/187–192, 197
See application file for complete search history.

(56) References Cited

U.S. PATENT DOCUMENTS

| | | | | |
|---|---|---|---|---|
| 57,876 | A * | 9/1866 | Davis | 452/52 |
| 322,181 | A * | 7/1885 | Hursh | 414/267 |
| 1,547,223 | A * | 7/1925 | Lyndale | 452/178 |
| 3,530,834 | A * | 9/1970 | Freund et al. | 119/728 |
| 3,984,101 | A * | 10/1976 | Garza | 482/96 |
| 4,806,063 | A | 2/1989 | York | |
| 4,997,152 | A | 3/1991 | Wagman | |
| 5,114,025 | A * | 5/1992 | Verreet | 212/274 |
| 5,211,601 | A * | 5/1993 | Cope | 452/187 |
| 5,417,609 | A | 5/1995 | Oldham | |
| 5,562,534 | A | 10/1996 | McGough | |
| 5,588,907 | A | 12/1996 | DePietro | |
| 5,662,451 | A | 9/1997 | Muzzi | |
| 6,109,855 | A | 8/2000 | Vela-Cuellar | |
| 6,202,868 | B1 * | 3/2001 | Murray | 212/294 |
| 6,250,483 | B1 * | 6/2001 | Frommer | 212/180 |
| 6,554,254 | B2 * | 4/2003 | Vetesnik | 254/325 |
| 6,626,748 | B2 | 9/2003 | Homer, Sr. | |
| 6,705,821 | B2 | 3/2004 | Philipps | |
| 6,994,618 | B1 * | 2/2006 | Syers | 452/187 |
| 7,059,956 | B1 * | 6/2006 | Summerlin | 452/192 |
| 7,261,631 | B1 * | 8/2007 | Golson, Sr. | 452/187 |
| 2002/0094771 | A1 * | 7/2002 | Butler | 452/128 |
| 2002/0173262 | A1 * | 11/2002 | Stiefel | 452/185 |

* cited by examiner

*Primary Examiner*—David J Parsley
(74) *Attorney, Agent, or Firm*—Heisler & Associates

(57) ABSTRACT

A portable game hoist supports game in the field without requiring attachment to a tree, vehicle or other separate structure. The hoist includes free-standing legs in pairs at opposite ends of a crossbeam. The crossbeam has a pulley mounted thereto, preferably upon a bracket with a hook on the bracket and below the pulley. A hanger is provided to which a game animal is attached. A cable is routed over the pulley and also over an end pulley adjacent one of the ends of the crossbeam. The cable is then routed down to a winch so that when the hanger is coupled to the cable, the hanger and game can be elevated. Once fully elevated, the hanger can be shifted to the hook adjacent the pulley and the cable removed for reuse on a second game animal, routing of the cable over a separate pulley suspended below the crossbeam.

14 Claims, 3 Drawing Sheets

FREE-STANDING COLLAPSIBLE GAME HOIST

CROSS-REFERENCE TO RELATED APPLICATIONS

This application claims benefit under Title 35, United States Code §119(e) of U.S. Provisional Application No. 60/855,039 filed on Oct. 30, 2006.

FIELD OF THE INVENTION

This invention relates to hunting equipment, and more particularly to a hoist-type support for use by hunters to support game objects, such as a deer or antelope. The hoist-type support for game is portable and may be carried in the field.

BACKGROUND OF THE INVENTION

It is conventional in hunting to eviscerate the carcass of a game object as soon as practicable after it has been killed. It is particularly convenient to suspend the carcass to render the game flesh as palatable as possible. Often a game object is porcine weighing in at fifty or more pounds. Such carcasses are suspended from makeshift means, such as a rail between two trees or suspended from an object, such as a vehicle. Hoisting game promptly after a kill is preferable and aids in keeping the game object away from pests and debris found on the ground. The present invention is an improvement over other game hoists as it does not rely on the availability of a nearby tree, vehicle or other support to operate. Further, the game hoist can be folded to facilitate transportation. The game hoist can be readied in minutes most anywhere in the field for hanging, cleaning and butchering large game.

A variety of game hoists are known in the prior art. Exemplary of such prior art game hoists include the following:

| U.S. Pat. No. | Inventor | Issue Date |
| --- | --- | --- |
| 4,806,063 | York | Feb. 21, 1989 |
| 4,997,152 | Wagman | Mar. 5, 1991 |
| 5,417,609 | Oldham | May 23, 1995 |
| 5,562,534 | McGough | Oct. 8, 1996 |
| 5,588,907 | DePietro | Dec. 31, 1996 |
| 5,662,451 | Muzzi | Sep. 2, 1997 |
| 6,109,855 | Vela-Cuellar | Aug. 29, 2000 |
| 6,626,748 | Homer, Sr. | Sep. 30, 2003 |
| 6,705,821 | Philipps | Mar. 16, 2004 |

These prior art game hoists generally are configured to be mountable to a tree or a vehicle, such that they benefit from the height of the tree or vehicle to provide support for elevating the game. However, these devices are not as freely usable when no trees are available or when no vehicles are available for attachment of such prior art devices. At least one game hoist does not require attachment to a vehicle or tree, namely the patent to Wagman (U.S. Pat. No. 4,997,152). However, Wagman does not include any substantially horizontal crossbar, but rather provides legs that come together at an apex point and leaving little clearance between the legs and the apex point where the game animal is suspended. A user thus has less maneuverability and flexibility when skinning and otherwise dressing the game.

Accordingly, a need exists for a game hoist that can be supported upon the ground, and which beneficially is collapsible so that it can be packed to a variety of different locations and then utilized even in locations where no trees or other overhanging structures are available. Such a device would further benefit from providing easy access to all sides of the game animal, and potentially lift multiple game animals and provide a lifting mechanism to provide a mechanical advantage to assist the user in lifting large game animals up off of the ground.

SUMMARY OF THE INVENTION

This invention provides a wild game hoist for hoisting game in the field. The invention is able to be disassembled for easy storage and portability. The game support comprising the present invention is relatively simple in construction, is collapsible into a small bundle and is readily arranged in operable position within a few minutes. It consists preferably of four extendible legs which are connected to a crossbeam. The crossbeam is supported by adjustable height legs and contains a winch secured to a support beam or leg. A pulley being secured to the distal end of the crossbeam and a cable extend from the winch and through the pulley. A hanger is secured to the end of the cable to support an animal, normally by its hind legs. Multiple hangers are envisioned for use with this invention. Further, it is envisioned that the crossbeam could be made longer by insertion of an extension beam (not shown). The invention may be made from steel or aluminum or other lightweight material.

The crossbeam further supports a mid pulley extending down from the crossbeam, and preferably rotatably mounted to a bracket fixed to the crossbeam. This bracket also includes a hook thereon slightly below the pulley. The cable extends to a tip which preferably has a loop thereon that can receive a hanger passing through the loop. The game animal is attached to the hanger and then the hanger is coupled to the loop. The hoist can then be utilized by cranking the winch or otherwise applying a tension load to the cable. The game animal is then lifted until the hanger is brought adjacent the mid pulley. The user can then simultaneously pass the hook of the bracket into engagement with the hanger so that the hanger is supported by both the cable and the hanger on the bracket.

The user can then release tension on the cable and remove the loop of the cable off of the hanger, leaving the hanger and game animal suspended from the hook. The cable can then be routed over an additional mid pulley on a separate bracket extending down from the crossbeam and a second game animal can be lifted utilizing the hoist of this invention. The user thus has the flexibility to lift multiple game animals if required.

OBJECTS OF THE INVENTION

Accordingly, a primary object of the present invention is to provide a fully portable, easily stored game hoist for use in suspending game in the field.

Another object of the present invention is to provide a portable game hoist that does not require support from surrounding objects, such as a tree.

Another object of the present invention is to provide a portable game hoist which gives a mechanical advantage to the user so that a greater lifting force can be applied to game than an amount of force being input into the game hoist.

Another object of the present invention is to provide a game hoist that is able to be used on uneven ground.

Another object of the present invention is to provide a game hoist which is easily transportable.

Another object of the present invention is to provide a game hoist to suspend multiple game objects simultaneously.

Another object of the present invention is to provide a game hoist which can utilize a single cable to suspend multiple game animals from the same hoist.

Other further objects of the present invention will become apparent from a careful reading of the included drawing figures, the claims and detailed description of the invention.

DESCRIPTION OF THE PREFERRED EMBODIMENT

Figure 1:
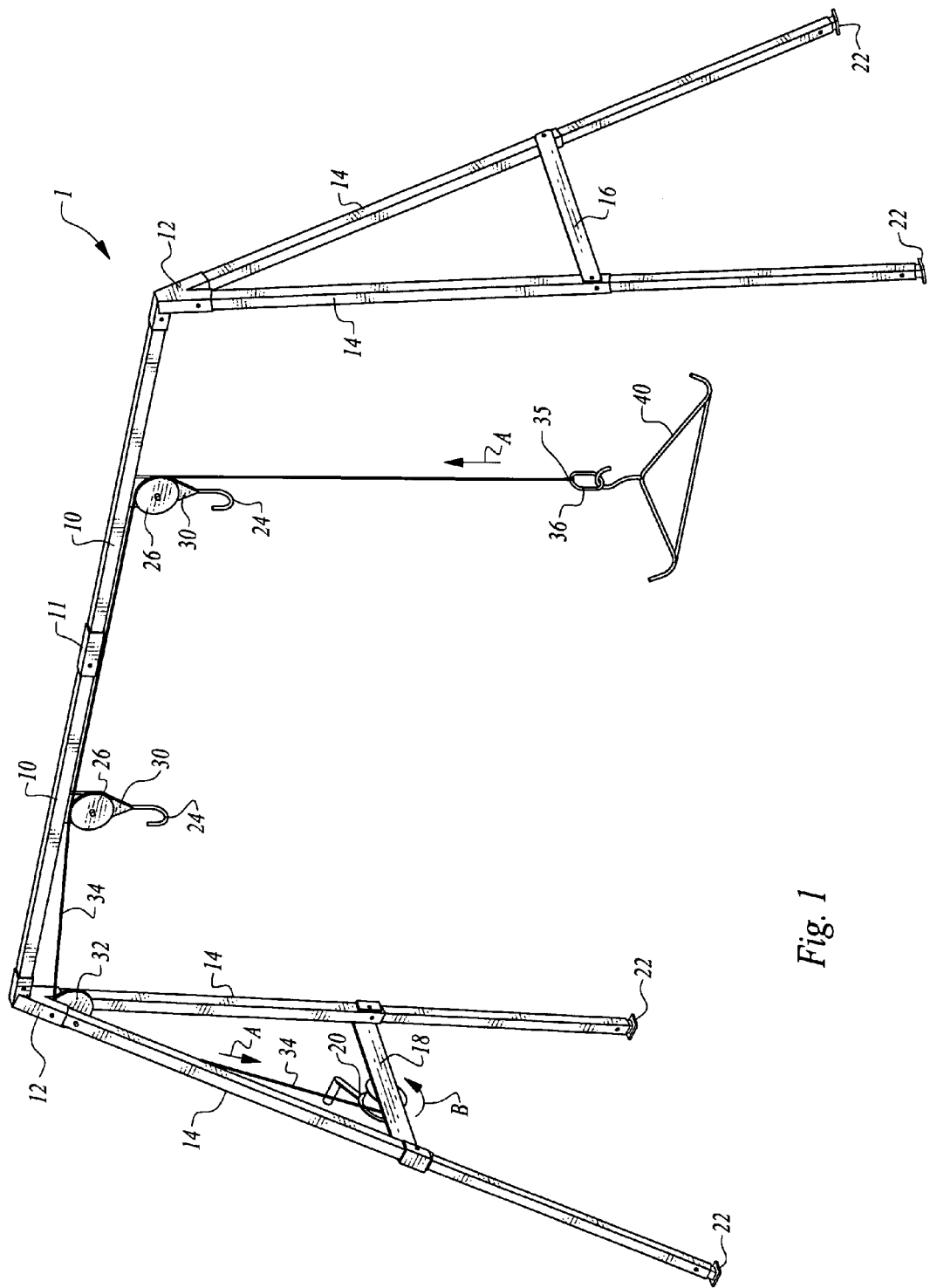
FIG. 1 is a perspective view of the game hoist of this invention shown before use of the invention to lift game.

Referring to the drawings, wherein like reference numerals are directed to like parts throughout the drawing figures, reference numeral 1 is directed to a game hoist for lifting game G. The portable game hoist 1 comprising the present invention primarily is preferably a quad structure and is designed for use, for example, by a hunter incident to hanging, skinning and butchering a wild game G, such as a deer. The present invention makes it no longer necessary to hang the game G from a tree limb or from a make-shift bar suspended between a pair of trees, and the design is such that one person may operate the device to lift the game object G in order to insure cooling, draining and field dressing the game.

Figure 2:
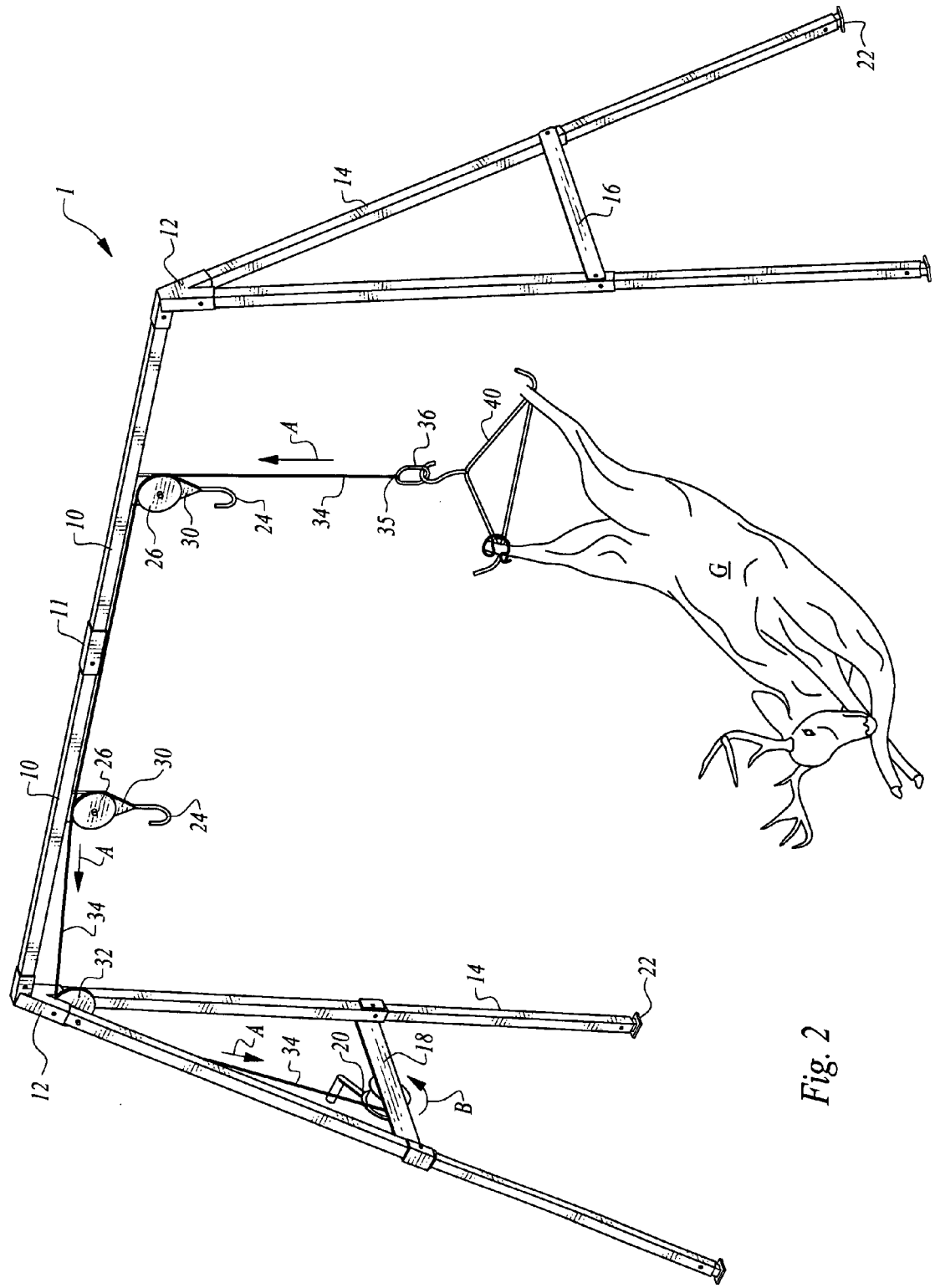
FIG. 2 is a perspective view similar to FIG. 1 but after attachment of game to a hanger thereof and partial lifting of the game animal.
Figure 3:
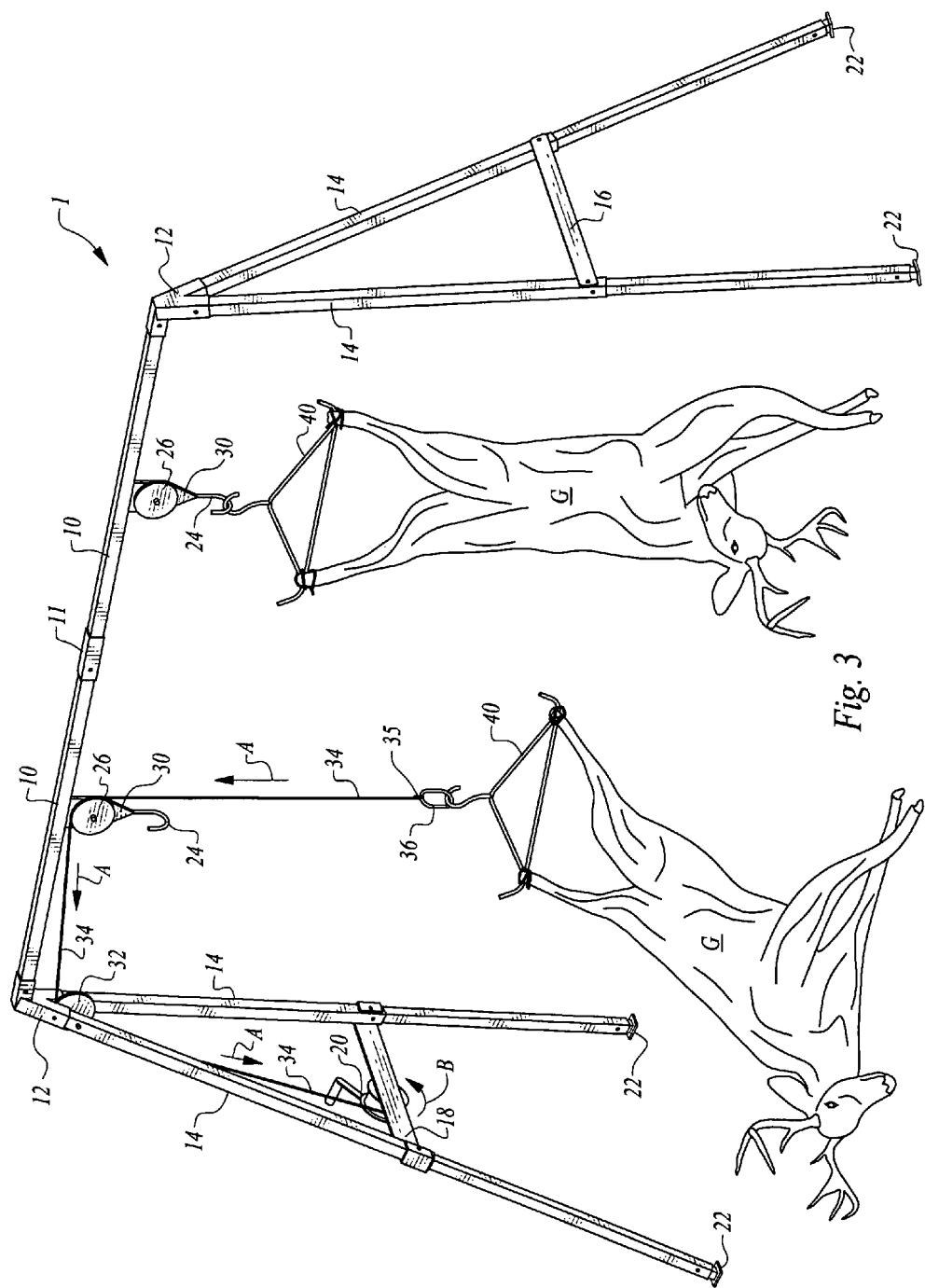
FIG. 3 is a perspective view of the game hoist of this invention after it has been fully utilized to lift a first game animal and suspend it from a hook thereof, and while in the process of lifting a second game animal.

Referring to FIGS. 1-3, the preferred structure of the hoist 1 includes a crossbeam 10. The crossbeam 10 is preferably a hollow square tube with male and female ends enabling the beam to mate. Other cross-sections could also be provided. Crossbeam 10 is provided with at least two receivers 12, which respectively receive the upper ends of the legs 14. If desired, the legs 14 may be formed from solid bar stock, preferably of light-weight metal, such as aluminum, for example, but preferably the legs 14, as shown in FIG. 2 are formed from tubular or square metal stock such as aluminum, and they are formed in collapsible sections for convenience of longitudinal adjustment of the legs, as well as compactness when arranged in idle condition, such as being carried in a case or otherwise.

In the embodiment specifically shown, the various longitudinally adjustable sections of the legs 14 are clearly shown as comprising a plurality of sections of decreasing diameter, starting at the lower end thereof and progressing to the upper end of each leg, such that telescoping action is facilitated. The sections may be locked in adjusted position by conventional means such as locking pins which are arranged to extend through matching holes in each pair of mating sections of the legs 14. If multiple holes are provides, the legs 14 can be adjusted to a desired variable height, such as to match uneven ground. Collapsing the legs 14 to a shortest height makes the legs 14 smaller for convenient storage or transport.

The lowermost section of each leg preferably is provided with a suitable foot member 22 which is engageable with the ground or other supporting surface when in use. Foot member 22 is preferably pivotal to adjust to any angle of ground or other supporting surface when in use. The upper end of each leg 14 or of the uppermost tubular member of each leg fits securely into receiver 12. Receiver 12 is preferably of a hitch strength rigid material and is united with the tubular uppermost leg section by a locking pin or threaded screw or other attaching means.

The purpose of the receiver 12 is to afford strength to the upper ends of the legs 14 and a means of removably attaching crossbeam 10 to legs 14. As shown in FIG. 2, the innermost ends of legs 14 are disposed at an angle (preferably about 10°) relative to each other and extend at a slight angle away from vertical from the crossbeam 10 to enhance stability compared to vertical legs. The angled legs 14 and the foot member 22 provide stability along with optional support 16 and optional winch beam 18. In its assembled position, support 16 attaches to a plurality of legs by means of a pin or other means of attachment. Support 16 provides stability for the invention.

Winch beam 18 preferably attaches to a plurality of legs by means of a pin or other means of attachment. Winch beam 18 also aids in stability of the game hoist and also provides a means for attaching winch 20. As an alternative, the winch 20 can be attached to one of the legs 14 and then the beam 18 becomes optional. Winch 20 receives a cable 34. The cable 34 is preferably made of strong intertwined metal wire or may be rope. Winch 20 enables the cable 34 to wind around winch 20 and through end pulley 32 and mid pulley 26 onto hook 24. There may be provided a plurality of hooks 24 to support a plurality of game objects G.

Each mid pulley 26 is preferably mounted to a bracket 30 extending down from the crossbeam 10. In particular, each bracket 30 is preferably in the form of a plate of solid rigid material having a front face that is substantially planar. A hole in the plate receives a pulley axle therethrough about which the mid pulley 26 is adapted to rotate. The mid pulley 26 is preferably located directly above the hook 24.

The crossbeam 10 preferably is provided in at least two parts with a junction 11 joining the two parts together. If only one game object G is to be elevated by the hoist 1, the receivers 12 can be merely attached to ends of one crossbeam 10 without utilization of the junction 11. If three or more game G are to be elevated, three or more crossbeams 10 could be coupled together to multiple separate junctions 11, provided the crossbeam 10 is formed of sufficient size and strength to handle the associated loads.

Most preferably, to maintain suitable strength, the hoist 1 is fitted with mid legs if more than two game animals are to be supported. Such mid legs are similar to the legs 14 with a diverging angle of about ten degrees from each other. The mid legs are preferably oriented in a common plane that is perpendicular to the crossbeam 10. A mid beam receiver replaces the junction 11 and is coupled to the crossbeam 10 sections on either side of the mid legs. Once assembled, such an expanded hoist 1 would have one or two crossbeam 10 sections on either side of the mid legs and be able to support two, three or four game animals simultaneously.

Each bracket 30 preferably includes a hook 24 at a lower end thereof. The hook 24 allows a hanger 40 to be suspended therefrom after having been raised by the hoist 1. Raising of the hanger 40 is caused by routing of the cable 34 from the winch 20, over an end pulley 32 adjacent one of the receivers 12 and then over the mid pulley 26 adjacent the hook 24 from which the hanger 40 and associated game G are to be suspended. The end pulley 32 is merely mounted on an axle coupled to each leg 14 adjacent one of the receivers 12. If the winch 20 is on a leg 14, the end pulley 32 can be angled to direct the cable 34 to the winch 20.

The cable 34 extends to a tip 35 that preferably includes a loop 36 thereon. A hanger 40 can be coupled to this loop 36 in a relatively loose fashion. Then when tension is applied to the cable 34, by rotation of the winch 20 (along arrow B) the cable 34 is caused to be elevated (along arrow A) below the mid pulley 26. The hanger 40 and associated game G are then elevated. Once the hanger 40 has been elevated all the way up to the mid pulley, the user can relatively easily maneuver the loop 36 at the end of the cable 34 onto the hook 24. The user can then provide slack in the cable 34 until the hanger 40 is only supported from the hook 24. The loop 36 can then be easily removed from the hanger 40.

After the game G has been successfully hung from the hook 24 through the hanger 40, the cable 34 can be rerouted over a separate mid pulley 26 on a separate bracket 30 (FIG. 3). The separate hanger 40 can then be coupled to a separate game object G and the process repeated to elevate a second game animal and suspend it from a second hook 24 extending down from the crossbeam 10. Once the game animal G has been successfully elevated, it can then be properly dressed and otherwise handled for proper preservation without damage thereto.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A free-standing game hoist, comprising in combination:
   a substantially horizontal elongate crossbeam having opposing ends;
   a first pair of legs adapted to be removably coupled to a first end of said crossbeam;
   a second pair of legs adapted to be removably coupled to a second end of said crossbeam opposite said first end;
   at least one middle pulley adjacent a portion of said crossbeam spaced from said ends;
   an end pulley adjacent one of said ends of said crossbeam;
   a winch secured at least indirectly to said legs below said crossbeam and below said end pulley;
   a cable routed from said winch, over each of said pulleys to a tip;
   said cable adapted to be coupled to a game object adjacent said tip, such that operation of said winch causes said cable to lift the game;
   wherein said at least one middle pulley is mounted upon a substantially rigid bracket extending down from said crossbeam, said at least one middle pulley having a central axis of rotation oriented substantially horizontal and substantially perpendicular to a horizontal transverse axis parallel to the elongate length of said crossbeam, said transverse axis extending laterally through the center of the at least one middle pulley, said at least one middle pulley having a groove for supporting said cable therein, said groove oriented within a substantially vertical plane substantially coplanar with said crossbeam and said end pulley;
   wherein said bracket is affixed to said crossbeam without motion between said bracket and said crossbeam when said bracket is attached to said crossbeam;
   said bracket including a hook below said pulley both being directly coupled and fixed to said bracket;
   wherein said hoist includes at least two middle pulleys spaced from each other and spaced from said ends of said crossbeam;
   said crossbeam formed of a plurality of separate sections, each said section adapted to be removably joined to adjacent said sections of said crossbeam, each of said at least two middle pulleys mounted on separate ones of said plurality of separate sections; and
   a plurality of game hangers each selectively attachable to one of a plurality of said hooks on a plurality of said brackets supporting said at least two middle pulleys, said plurality of game hangers adapted to suspend multiple game carcasses from said hoist at the same time.

2. The hoist of claim 1 wherein said hoist includes a hanger adapted to be coupled to the game object, said hanger adapted to be removably attached to said cable tip.

3. The hoist of claim 2 wherein said bracket includes a substantially rigid planar plate, said plate having a front surface, said pulley rotatably mounted upon an axle passing through said plate of said bracket.

4. The hoist of claim 3 wherein said plate of said bracket is oriented within a plate plane spaced from said vertical plane of said groove of said middle pulley, said plate plane including said crossbeam therein.

5. The hoist of claim 1 wherein said first pair of legs are spaced from each other and extend down from said crossbeam with increasing distance between said pair of legs as said pair of legs extend down from said crossbeam, a winch beam removably coupled to each of said first pair of legs, said winch mounted to said winch beam below said end pulley.

6. The hoist of claim 5 wherein each of said first pair of legs are provided in two parts including an upper part and a lower part, said two parts of said legs each nested within each other and with a foot at a lower end of each of said legs, said feet including holes passing therethrough through which ground engaging fasteners can be positioned.

7. A method for lifting game up off the ground, including the steps of:
   providing a free-standing game hoist including a substantially horizontal elongate crossbeam having opposing ends; a first pair of legs adapted to be removably coupled to a first end of said crossbeam; a second pair of legs adapted to be removably coupled to a second end of said crossbeam opposite said first end; an end pulley and at least one middle pulley adjacent a portion of said crossbeam spaced from said ends; wherein said at least one middle pulley is mounted upon a substantially rigid bracket extending down from said crossbeam, said at least one middle pulley having a central axis of rotation oriented substantially horizontal and substantially perpendicular to a horizontal transverse axis parallel to the elongate length of said crossbeam, said transverse axis extending laterally through the center of the at least one middle pulley, said at least one middle pulley having a groove for supporting said cable therein, said groove oriented within a substantially vertical plane substantially coplanar with said crossbeam and said end pulley; wherein said bracket is affixed to said crossbeam without motion between said bracket and said crossbeam when said bracket is attached to said crossbeam; said bracket including a first hook below said pulley both being directly coupled and fixed to said bracket; said end pulley adjacent one of said ends of said crossbeam; a cable routed over each of said pulleys to a tip; the cable adapted to be coupled to a first hanger, the hanger adapted to have game secured thereto, such that applying a tension force to the cable causes the cable to lift the hanger and game secured to the hanger;

attaching game to the hanger;

coupling the hanger to the cable;

applying a tension load to the cable to lift the game until the hanger is adjacent the middle pulley;

locating said first hook adjacent the at least one mid pulley;

attaching the hanger to the first hook, such that weight of the game is suspended from the hook;

providing a second middle pulley extending down from said crossbeam, providing a second hook below said second middle pulley, rerouting said cable to pass over said second middle pulley, attaching a second hanger to a second game animal;

applying a tension force to the cable to lift the second game animal and attaching the second hanger to the second hook;

forming the crossbeam of a plurality of sections, each section adapted to be removably joined to adjacent sections of the cross beam, each of the two middle pulleys mounted on separate ones of the plurality of separate sections; and configuring the first and second hangers to be selectively attachable to one of the first and second hooks on a plurality of the brackets supporting the first and second middle pulleys, the first and second game hangers adapted to suspend multiple game carcasses from the hoist at the same time.

8. The method of claim 7 including the further steps of:

providing a loop adjacent the tip of the cable; and removing the hanger from the loop on the cable after the hanger has been attached to the hook.

9. The method of claim 8 including the further step of relaxing tension on the cable after attaching the hanger to the hook to simplify removal of the hanger from the loop adjacent the tip of the cable.

10. The method of claim 7 wherein said tension applying step includes the step of mounting a winch to an end of the cable opposite the tip; and rotating the winch to draw cable onto the winch.

11. A free-standing game lifting apparatus, comprising in combination:

a substantially horizontal elongate crossbeam having opposing ends;

two pairs of legs extending down from ends of said crossbeam, each of said legs adapted to engage the ground and support said elongate crossbeam in a substantially horizontal configuration;

at least one middle pulley adjacent a portion of said crossbeam spaced from said ends;

an end pulley adjacent one of said ends of said crossbeam;

a cable routed over each of said pulleys and terminating at a tip;

said cable adapted to be coupled to game adjacent said tip, such that applying tension to the cable causes the cable to lift the game;

wherein said at least one middle pulley is mounted upon a substantially rigid bracket extending down from said crossbeam;

wherein said bracket is affixed to said crossbeam without motion between said bracket and said crossbeam when said bracket is attached to said crossbeam, said at least one middle pulley having a central axis of rotation oriented substantially horizontal and substantially perpendicular to a horizontal transverse axis parallel to the elongate length of said crossbeam, said transverse axis extending laterally through the center of the at least one middle pulley, said at least one middle pulley having a groove for supporting said cable therein, said groove oriented within a substantially vertical plane substantially coplanar with said crossbeam and said end pulley;

said bracket including a hook below said pulley both being directly coupled and fixed to said bracket;

wherein said hoist includes at least two middle pulleys spaced from each other and spaced from said ends of said crossbeam;

said crossbeam formed of a plurality of separate sections, each said section adapted to be removably joined to adjacent said sections of said crossbeam, each of said at least two middle pulleys mounted on separate ones of said plurality of separate sections; and a plurality of game hangers each selectively attachable to one of a plurality of said hooks on a plurality of said brackets supporting said at least two middle pulleys, said plurality of game hangers adapted to suspend multiple game carcasses from said hoist at the same time.

12. The apparatus of claim 11 wherein a hanger is provided that is removably attachable to said cable adjacent said tip, said hanger adapted to be coupled to the game.

13. The apparatus of claim 12 wherein said cable includes a loop thereon adjacent said tip, said hanger adapted to be removably attached to said loop.

14. The apparatus of claim 11 wherein a winch is coupled to at least one of said legs below said crossbar, said cable having an end thereof opposite said tip coupled to said winch, such that when said winch is operated said cable is caused to apply a tension load tending to lift the tip of the cable upward.

\* \* \* \* \*